Sept. 10, 1929.  D. W. JONES  1,727,985
AUTOMATIC TRANSMISSION
Original Filed Jan. 29, 1926   2 Sheets-Sheet 1
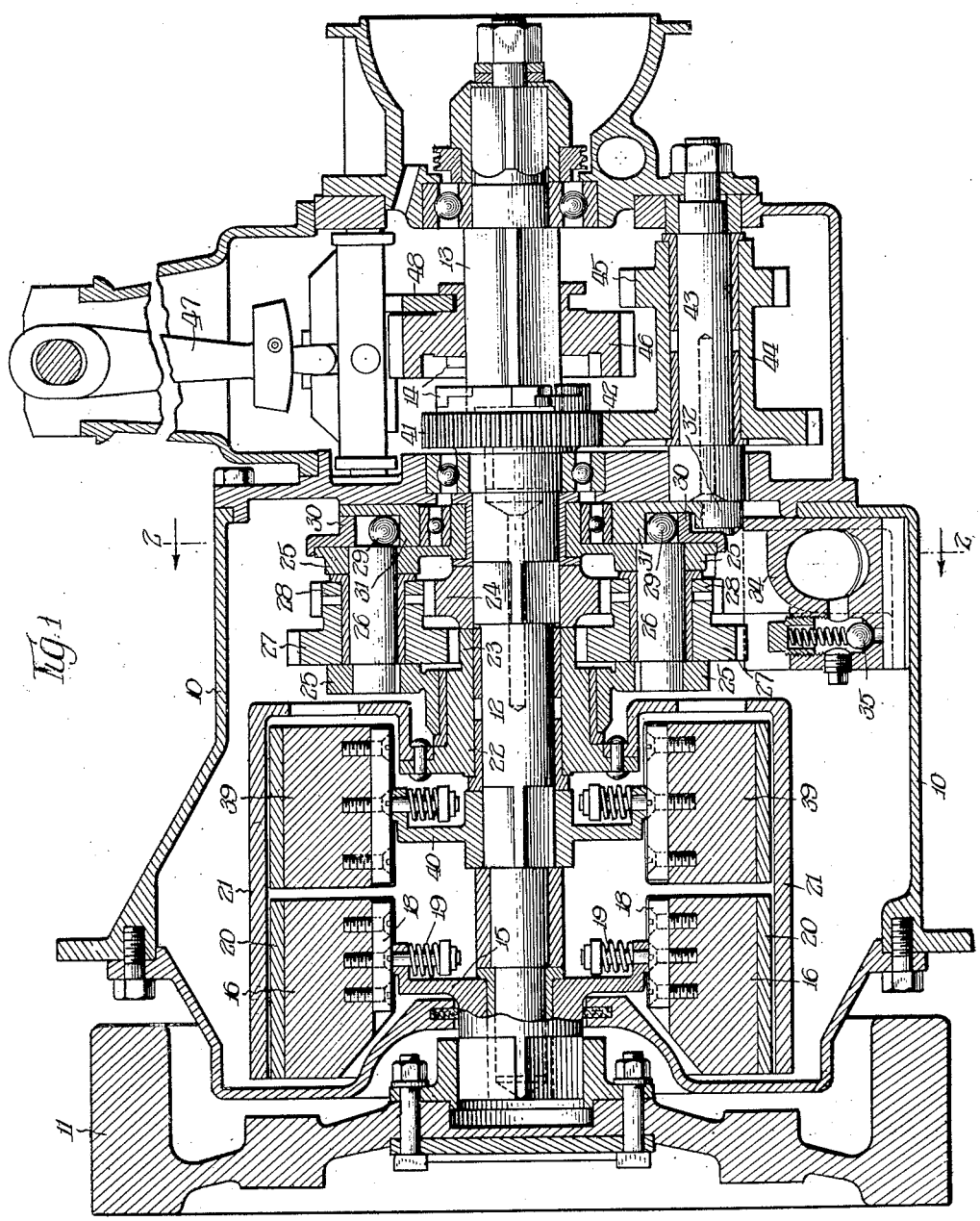
Witness:
R. Burkhardt.
Inventor:
David W. Jones,
By Cromwell, Greist & Warden
attys Sept. 10, 1929. D. W. JONES 1,727,985
AUTOMATIC TRANSMISSION
Original Filed Jan. 29, 1926 2 Sheets-Sheet 2
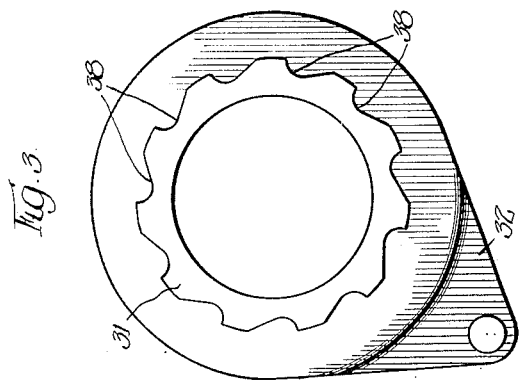
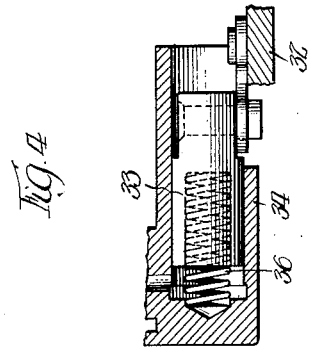
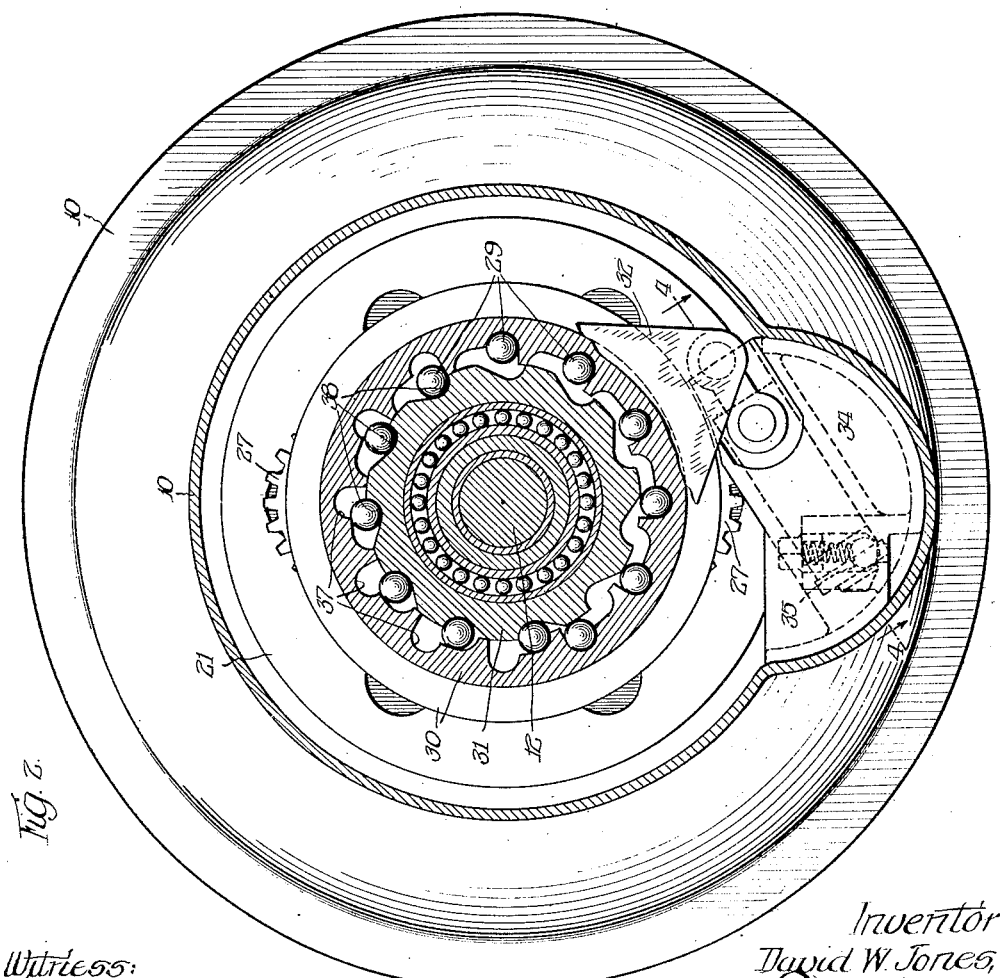

Patented Sept. 10, 1929.

1,727,985

UNITED STATES PATENT OFFICE.

DAVID W. JONES, OF CHICAGO, ILLINOIS, ASSIGNOR TO FLEXO-DRIVE CORPORATION, OF ROCKFORD, ILLINOIS, A CORPORATION OF ILLINOIS.

AUTOMATIC TRANSMISSION.

Application filed January 29, 1926, Serial No. 84,558. Renewed July 8, 1929.

The present invention relates to automatic transmissions for vehicles, and has to do particularly with transmissions of the type disclosed in the copending application of William E. Johnson filed November 12, 1923, Serial No. 674,157, wherein two sets of centrifugally operated friction shoes are connected with the driving and driven elements in such a way as to establish between the elements automatically variable ratios of power transmission which will change in conformity with operating conditions.

One object of the invention is to provide an improved transmission of the type described in which both of the sets of shoes coact with but a single drum, resulting in a much more simple construction.

Another object is to provide such a transmission in which the shoes connected with the driving element are of greater mass than the other shoes, whereby to produce in operation a flexible torque connection between the driving element and the drum which is strong enough to carry the additional torque of the other flexible connection between the drum and the driven element.

Another object is to provide such a transmission in which the back-stop for the planet gearing connected with the drum is to a certain extent yieldable, preventing any jar when the back-stop comes into play.

In order that the invention may be readily understood, a preferred embodiment of the same is presented in the accompanying drawings and following description, but such embodiment is merely intended for the purpose of exemplification as the invention is also susceptible of embodiment in divers other forms coming equally within the contemplation of the same.

In the drawings:

Fig. 1 is a vertical longitudinal section taken through the center of the transmission;

Fig. 2 is a vertical transverse section taken on the line 2—2 of Fig. 1;

Fig. 3 is a detail view of the inner ring member of the back-stop; and

Fig. 4 is a section taken on the line 4—4 of Fig. 2, showing the interior of the dash pot which forms a part of the back-stop.

The transmission is somewhat similar, in its general features of construction, arrangement and operation, to that disclosed in the above mentioned application of William E. Johnson. The transmission is fully automatic, and differs saliently from other types in that it is equipped with two sets of centrifugally operated friction shoes which rotate respectively with the driving and driven elements. One set of shoes has a direct connection with the driving element and acts frictionally against a drum which has a reduced connection through planet gearing with the driven element, and the other set has a direct connection with the driven element and acts frictionally against the drum driven by the first set, which arrangement gives a device in which the ratio of power transmission is flexible and will automatically vary under control of both the speed and the load to adjust itself properly to any particular operating condition.

The clutch ordinarily used between motor and transmission may be dispensed with, and the transmission may be contained in a casing 10 at the rear of the fly wheel 11 of the motor. Two shafts 12 and 13 are rotatably mounted in the casing in axial alignment with the fly wheel 11. For convenience, the fly wheel 11 may be considered the driving element of the transmission, and either the shaft 12 or the shaft 13 the driven element, since the shaft 13 is connected directly with the propeller shaft through the universal and the shaft 12 normally is connected directly with the shaft 13 by means of a manually operable jaw clutch 14.

A spider 15 is secured to the fly wheel 11, and carries a set of shoes 16. The shoes 16—preferably four in number—are arranged at equal intervals about the circumference of the spider, and are held against circumferential movement relative thereto by positioning keys 18, which keys permit the shoes to move radially of the spider under centrifugal force against the yielding resistance of return springs 19. The shoes are shaped as cylindrical segments, and their curved outer surfaces are provided with linings 20 of suitable friction material.

A long cylindrical drum 21 encompasses the shoes 16, and coacts frictionally with the same in a bath of oil carried in the casing. The shoes 16 are arranged within the front end of the drum, and the rear end of the drum extends inwardly and is secured to a sleeve 22 which is journalled on the shaft 12 and terminates rearwardly in a pinion 23. The front end of the shaft 12 is conveniently journalled in a central recess in the spider 15. The pinion 23 is positioned immediately in front of a larger pinion 24 which is secured to the shaft 12, and a bracket 25 is journalled at its front end on the sleeve 22 and at its rear end on the shaft 12 and supports two diametrically disposed countershafts 26. Two fixedly associated pinions 27 and 28 of different sizes are rotatably mounted on each of the countershafts 26, with the larger front pinions 27 in mesh with the pinion 23 and the smaller rear pinions 28 in mesh with the pinion 24.

The bracket 25 is free to turn in the direction in which the fly wheel 11 rotates, but is prevented from turning in the reverse direction by means of a back-stop device in the form of a plurality of balls 29 which are caged between two ring members 30 and 31. This arrangement is clearly illustrated in Fig. 2. The outer member 30 is secured to the bracket 25, while the inner member 31 is journalled on a sleeve of the bracket and is held against any substantial amount of rotation thereon by a radially extending arm 32 on the member. The outer end of the arm 32 is connected with a small piston 33 by means of a short linkage, and the piston 33 is mounted for reciprocal movement in a small oil cylinder or dash pot 34 which is positioned in the bottom of the casing 10. The cylinder 34 is provided adjacent its closed end with a check valve 35 in the form of a spring pressed ball which coacts with an inlet port in the cylinder in such a way as to permit oil to flow into the cylinder when the piston is moved outwardly by a spring 36 but prevent oil in the cylinder from flowing out of the same again when the piston is moved inwardly, thereby cushioning the piston and allowing it to move inwardly only as fast as the oil can escape from the cylinder by seeping past the piston.

When the outer member 30 is turning in the direction in which the fly wheel is rotating, the balls 29 of the back-stop device are seated by centrifugal force in pockets 37 in that member 30, but, when the member 30 is at rest and attempts to turn in the reverse direction, the balls above the center of the transmission shift by gravity into locking pockets 38 in the inner member 31, thereby preventing such reverse movement. The piston 33 of the cushioning device for the inner member 31 is normally in its outermost position in the cylinder 34, but, when the member 31 attempts to rotate in a reverse direction, it acts through the piston upon the oil in the cylinder and is as a consequence brought to a gradual stop.

Another set of shoes 39 is positioned within the drum 21 in the space between the shoes 16 and the rear end of the drum. The shoes 39 are carried in the same manner as the shoes 16 on a spider 40, and the spider 40 is secured to the shaft 12. The shoes 39 differ from the shoes 16 only in that they are of smaller size, the shoes 16 being of greater mass because they must withstand also the torque set up by the shoes 39.

The direction of rotation of the shaft 13 may be reversed relative to that of the shaft 12 by means of a suitable train of gearing. A pinion 41 is secured to the shaft 12 at the rear end thereof, and meshes with a larger pinion 42 which is journalled on a counter shaft 43 in the lower part of the casing. The pinion 42 is provided with a rearwardly extending sleeve 44 which terminates in a smaller pinion 45, and the pinions 42 and 45 rotate together on the counter shaft 43. Another pinion 46 is nonrotatably but slidably mounted on a squared portion of the shaft 14, and may be shifted into any one of three positions along that shaft. The pinion 46 presents on its front face one of the two interlocking clutch elements of the jaw clutch 14, the other of such elements being presented on the rear face of the shaft 12, and, when the pinion 46 is shifted into its front position, the elements of the clutch will interlock with each other and the shafts 12 and 13 can rotate only as a unit. When the pinion 46 is in its intermediate position, as shown in Fig. 1, there is no driving connection between the shafts 12 and 13 and the transmission is in neutral. When the pinion 46 is shifted into its rear position, the pinion 45 will mesh therewith to effect a driving connection between the shafts 12 and 13 at a reduction. A manually operated lever 47 may be used to shift the pinion 46, through an intermediate connecting yoke 48.

The transmission operates in the following manner:

It will be assumed that the elements of the jaw clutch 14 are in interlocked association, since that is the condition which is normally maintained. When the driving element, represented by the fly wheel 11, is rotating at an idling speed, there will not be any transmission of power through the device, since the shoes 16 will not be thrown outwardly with sufficient centrifugal force against the drum 21 to engage frictionally with the same. When the speed of the driving element is accelerated above an idling one, however, the shoes 16 will engage frictionally with the drum 21, and will gradually bring the drum into synchronous rotation therewith, under which condition the driven element, represented by the shafts 12 and 13, will be rotated slowly through the reduction provided by the planet gearing 23, 27, 28 and 24, which gearing is held against reverse rotation by the back-stop device associated therewith. If the speed thus imparted to the driven element is sufficient to cause the shoes 39 to be thrown outwardly into frictional engagement with the drum, as upon further acceleration of the driving element, the drum will tend to carry the shoes 39 along with it because it is rotating more rapidly than such shoes, and the driven element with which the shoes 39 are associated will be thereby gradually accelerated to the speed of the drum, the shoes 39 of course pressing with increasing force against the drum 21 as the speed of the driven element increases. When the speed of rotation of the shoes 39 has reached that of the drum, the two sets of shoes, the drum and the planet gearing will all rotate as a unit with the driving and driven elements. When the load resistance increases to an amount in excess of that which the motor will efficiently develop in torque at the speed at which it is running, the shoes 39 will be forced by such resistance to discontinue their static frictional engagement with the drum, and the then forwardly rotating bracket 25 and associated planet gearing will gradually return again to a stationary position in which the transmission will deliver the torque of the motor to the driven element through the reduction provided by the gearing.

I claim:

1. In a flexible power transmission, a driving element, a driven element, a drum which is rotatable with respect to the driving element and has a reduced torque transmitting connection with the driven element, and two rotatable sets of shoes connected respectively with the driving and driven elements for frictional coaction with different portions of the drum under the action of centrifugal force.

2. In a flexible power transmission, a driving element, a driven element, a cylindrical drum which is rotatable with respect to the driving element and has a reduced torque transmitting connection with the driven element, and two rotatable sets of shoes connected respectively with the driving and driven elements for frictional coaction with axially spaced portions of the drum under the action of centrifugal force.

3. In a flexible power transmission, a driving element, a driven element, a drum which is rotatable with respect to the driving element and has a reduced torque transmitting connection with the driven element, and two rotatable sets of shoes connected respectively with the driving and driven elements for frictional coaction with different portions of the drum under the action of centrifugal force, the set of shoes connected with the driving element being of greater mass than the other set.

4. In a flexible power transmission, a driving element, a driven element, a drum which is rotatable with respect to the driving element and has a reduced torque-transmitting connection with the driven element comprising planetary gearing, a clutching device between said planetary gearing and said driven shaft, and two rotatable sets of shoes connected respectively with the driving and driven elements for frictional coaction with different portions of said drum under centrifugal control.

In testimony whereof I have hereunto subscribed my name.

DAVID W. JONES.